United States Patent
Lee et al.

(10) Patent No.: US 9,669,887 B2
(45) Date of Patent: Jun. 6, 2017

(54) MULTI-PARTS AUTOTRANSFERRING APPARATUS FOR VEHICLE

(71) Applicant: Hyundai Motor Company, Seoul (KR)

(72) Inventors: Yong Woon Lee, Busan (KR); Kum Jong Lee, Seoul (KR)

(73) Assignee: Hyundai Motor Company, Seoul (KR)

( * ) Notice: Subject to any disclaimer, the term of this patent is extended or adjusted under 35 U.S.C. 154(b) by 741 days.

(21) Appl. No.: 14/137,401

(22) Filed: Dec. 20, 2013

(65) Prior Publication Data

US 2015/0107095 A1 Apr. 23, 2015

(30) Foreign Application Priority Data

Oct. 17, 2013 (KR) .......................... 10-2013-0123946

(51) Int. Cl.
*B23P 19/08* (2006.01)
*B62D 65/00* (2006.01)
*B23P 19/00* (2006.01)
*B62D 65/02* (2006.01)

(52) U.S. Cl.
CPC .............. *B62D 65/00* (2013.01); *B23P 19/00* (2013.01); *B62D 65/022* (2013.01); *Y10T 29/53* (2015.01)

(58) Field of Classification Search
CPC . B23P 19/10; B23P 19/04; B23Q 1/70; B23Q 1/03; B23Q 2701/00; B23Q 2703/12; B23Q 2703/08
See application file for complete search history.

(56) References Cited

U.S. PATENT DOCUMENTS

| | | | | |
|---|---|---|---|---|
| 5,150,506 | A * | 9/1992 | Kotake | B62D 65/02 29/407.05 |
| 5,915,742 | A * | 6/1999 | Hung | B25B 11/02 269/17 |
| 6,467,675 | B1 * | 10/2002 | Ozaku | B62D 65/00 228/175 |
| 2011/0099788 | A1* | 5/2011 | Kilibarda | B62D 65/18 29/428 |
| 2012/0137490 | A1 | 6/2012 | Kweon et al. | |
| 2015/0107095 | A1* | 4/2015 | Lee | B23P 19/00 29/700 |

FOREIGN PATENT DOCUMENTS

| | | |
|---|---|---|
| JP | 2003-220984 A | 8/2003 |
| KR | 0182485 B1 | 8/1998 |
| KR | 1999-017865 A | 3/1999 |
| KR | 1020040055063 A | 6/2004 |

(Continued)

*Primary Examiner* — Lee D Wilson
(74) *Attorney, Agent, or Firm* — Morgan Lewis & Bockius LLP

(57) ABSTRACT

A multi-parts autotransferring apparatus for transferring parts to be mounted in a car body includes: a body configured to be mounted spaced apart from a ground by a plurality of supports; a vertical moving part configured to be mounted at the lower portion of the body to descend; a horizontal moving part configured to be mounted at a lower portion of the vertical moving part to be advanced and retreated in a front and rear direction; front jig parts configured to be each mounted at opposing sides of a front of the horizontal moving part; and rear jig parts configured to be each mounted at opposing sides of a rear of the horizontal moving part.

15 Claims, 9 Drawing Sheets

(56) References Cited

FOREIGN PATENT DOCUMENTS

| | | | |
|---|---|---|---|
| KR | 1020070098196 | A | 10/2007 |
| KR | 10-2008-0024355 | A | 3/2008 |
| KR | 20-2010-0008158 | U | 8/2010 |
| KR | 1020100099548 | A | 9/2010 |
| KR | 10201000995458 | A | 9/2010 |
| KR | 102012005505 | A | 5/2012 |
| KR | 1020120055105 | A | 5/2012 |
| KR | 1020120059986 | A | 6/2012 |

* cited by examiner

FIG. 1 – RELATED ART

MULTI-PARTS AUTOTRANSFERRING APPARATUS FOR VEHICLE

CROSS-REFERENCE TO RELATED APPLICATION

The present application claims priority of Korean Patent Application Number 10-2013-0123946 filed Oct. 17, 2013, the entire contents of which application is incorporated herein for all purposes by this reference.

BACKGROUND OF INVENTION

Field of Invention

The present invention relates to a multi-parts autotransferring apparatus for a vehicle, and more particularly, to a multi-parts autotransferring apparatus for a vehicle capable of transferring multi-parts for a vehicle after holding the parts without exchanging separate units.

Description of Related Art

Generally, in order for a car maker to manufacture a car, there is a need to perform various process lines from a selection of materials to mass production of parts. These processes are performed by an automation system introduced in keeping with a factory automation trend to manufacture more products within a shorter period of time. As one example of the automation system, a continuous production scheme of assembling various parts in a car body which is continuously moving on a conveyer at a constant speed in an assembling line for mass production has been mainly used.

The continuous production scheme using the conveyer system is disclosed in detail in Korean Patent No. 10-0482149 entitled "Vehicle Assembly Line Having Multi Parts Autotransferring Apparatus".

That is, the vehicle assembly line having a multi-parts autotransferring apparatus is an assembly line in which a door, a hood, and a trunk part are assembled. A finished product of a panel, such as a door and a hood, which suffers from a press process of inserting a steel sheet between an upper mold and a lower mold of a press machine and reciprocally compressing the steel sheet to perform a permanent deformation, such as molding, bonding, and separation, on the steel sheet is mounted in a car body while moving along each assembling zone by a transferring apparatus mounted at a floor and a ceiling (top) of a workplace.

Meanwhile, as illustrated in FIG. 1, a multi-parts transferring apparatus 10 according to the related art is provided with a plurality of dedicated units 11 for each car model, in which the dedicated units 11 for each car model hold a part 1 and move the part 1 to an assembly line.

However, the multi-parts transferring apparatus according to the related art suffers from interference between the dedicated units 11 for each car model and therefore a position thereof needs to be newly designed so as to adapt a new car model, in particular, the dedicated units 11 for each car model needs to be mounted to be replaced.

The information disclosed in this Background section is only for enhancement of understanding of the general background of the invention and should not be taken as an acknowledgement or any form of suggestion that this information forms the prior art already known to a person skilled in the art.

BRIEF SUMMARY

Accordingly, various aspects of the present invention have been made to solve the above-mentioned problems occurring in the prior art while advantages achieved by the prior art are maintained intact.

Various aspects of the present invention provide for a multi-parts autotransferring apparatus for a vehicle capable of holding multi-parts and moving the multi-parts to an assembly line independent of a new car model.

Various aspects of the present invention provide for a multi-parts autotransferring apparatus for a vehicle transferring parts to be mounted in a car body, including: a body configured to be mounted to be spaced apart from a ground by a plurality of supports and have the part disposed at a lower portion thereof; a vertical moving part configured to be mounted at the lower portion of the body to descend toward the part; a horizontal moving part configured to be mounted at a lower portion of the vertical moving part to be advanced and retreated in a front and rear direction of the part; front jig parts configured to be each mounted at both sides of a front of the horizontal moving part and hold both side portions of a front of the part; and rear jig parts configured to be each mounted at both sides of a rear of the horizontal moving part and hold both side portions of a rear of the part.

The vertical moving part may include a vertical moving member configured to be slidably mounted at the lower portion of the body in a direction of the part and a first motor configured to move the vertical moving member in the direction of the part.

The vertical moving member may include a vertical moving piece configured to be mounted at the lower portion of the body and guide bars configured to be disposed at each corner of the vertical moving pieces and slidably inserted into the guide pieces which are disposed at each corner of the body.

The horizontal moving part may include a horizontal moving member configured to be disposed at the lower portion of the vertical moving part and disposed to be advanced or retreated in a front and rear direction of the part and a second motor configured to advance or retreat the horizontal moving member in a front and rear direction of the part.

The horizontal moving part may be provided with a screw shaft configured to be disposed at the lower portion of the vertical moving part in the front and rear direction of the part and rotate by the second motor and the horizontal moving member may be advanced or retreated along the screw shaft at the time of a rotation of the screw shaft while the horizontal moving member being coupled with the screw shaft.

The front jig part may include front rotating members configured to be rotatably disposed at both sides of a front of the horizontal moving part, a plurality of front jigs having different lengths configured to be disposed at a side portion of the front rotating member, and a third motor configured to direct any one of the plurality of front jigs disposed at the front rotating member to the part by rotating the front rotating member.

The front jig may hold the side portion of the front of the part while vertically rotating by a hydraulic cylinder.

The front jig part may be rotatably disposed at both side portions of the front of the horizontal moving part in an inclined state.

The rear jig part may include rear rotating members configured to be rotatably disposed at both sides of a rear of the horizontal moving part, a plurality of rear jigs having different lengths configured to be disposed at a side portion of the rear rotating member, and a fourth motor configured to direct any one of the plurality of rear jigs disposed at the rotating member to the part by rotating the rear rotating member.

The rear jig may hold the side portion of the rear of the part while vertically rotating by a hydraulic cylinder.

The rear jig may be rotatably disposed at both side portions of the rear of the horizontal moving part in a vertical state.

The rear jig parts each disposed at both side portions of the rear of the horizontal moving part may be slidably disposed in a direction corresponding to each other by a width moving part.

The width moving part may include rack gears configured to be each disposed at the rear jig parts which are each disposed at both side portions of the rear of the horizontal moving part to correspond to each other, a pinion configured to be meshed between the rack gears which are each disposed at the rear jig part, and a fifth motor configured to rotate the pinion.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Figure 1:
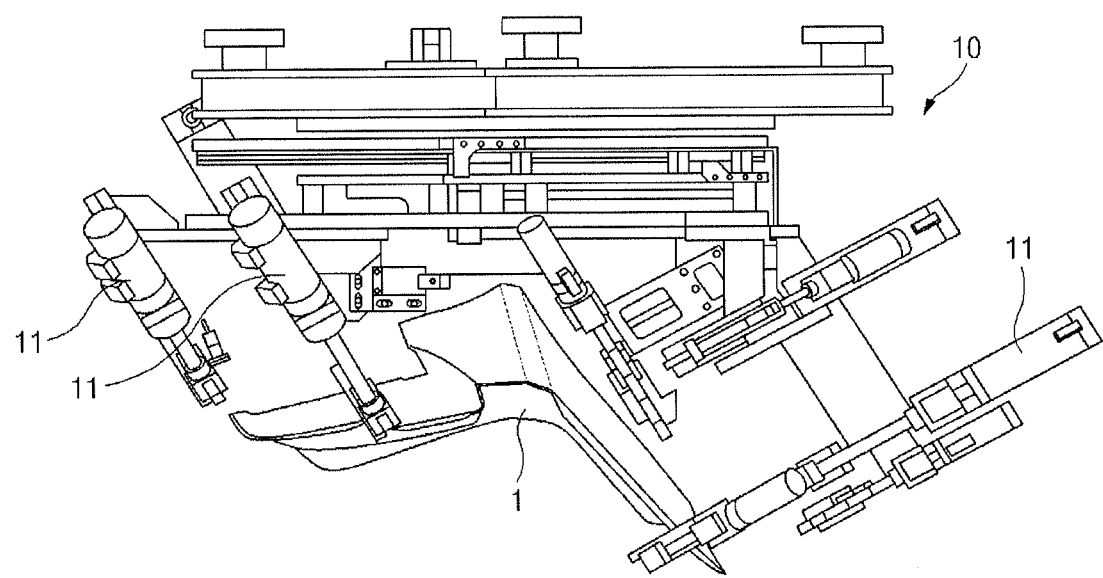
FIG. 1 is a diagram illustrating a multi-parts autotransferring apparatus for a vehicle according to the related art.

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

A multi-parts autotransferring apparatus for a vehicle according to various embodiments of the present invention is configured to hold parts of various car models by using front and rear jig parts in which various front or rear jigs are mounted and move the parts, thereby increasing continuity and efficiency of work.

In the accompanying drawings, portions unrelated to the description will be omitted in order to obviously describe the present invention, and similar reference numerals will be used to describe similar portions throughout the present specification.

In various embodiments of the present invention, a trunk among parts of a vehicle will be illustrated as one example.

Figure 2:
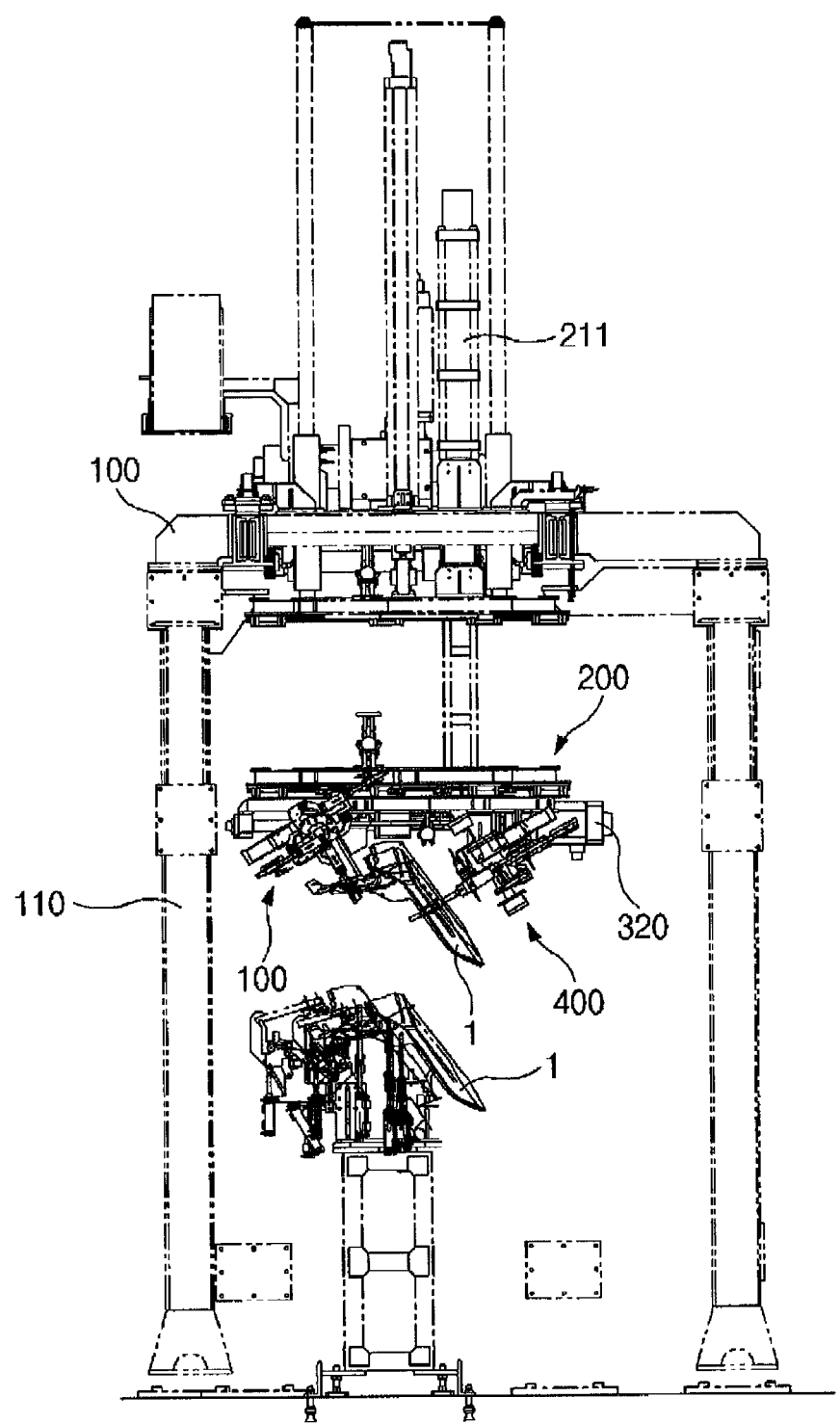
FIG. 2 is a front view illustrating an exemplary multi-parts autotransferring apparatus for a vehicle according to the present invention.
Figure 3:
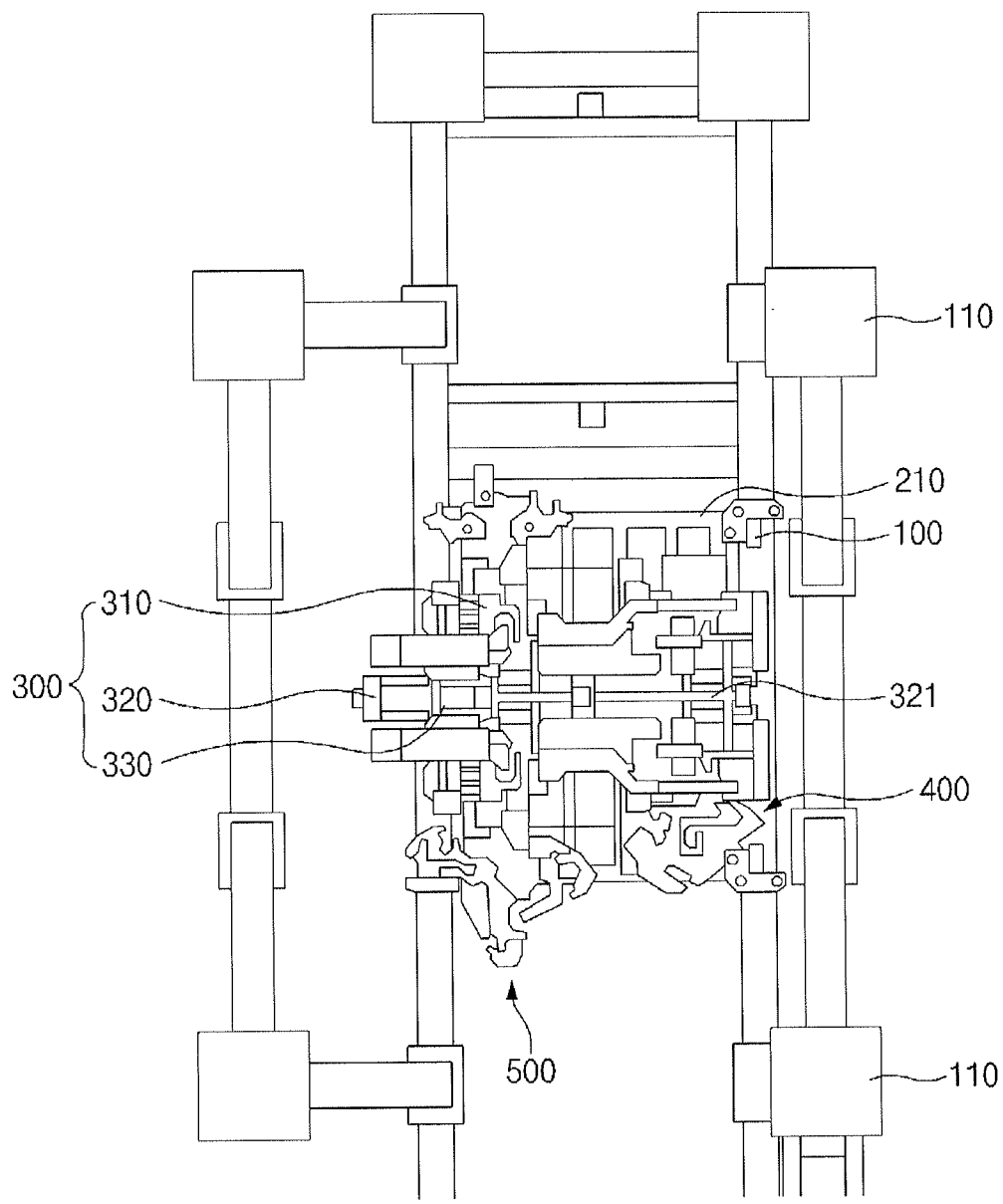
FIG. 3 is a bottom view illustrating the exemplary multi-parts autotransferring apparatus for a vehicle according to the present invention.
Figure 4:
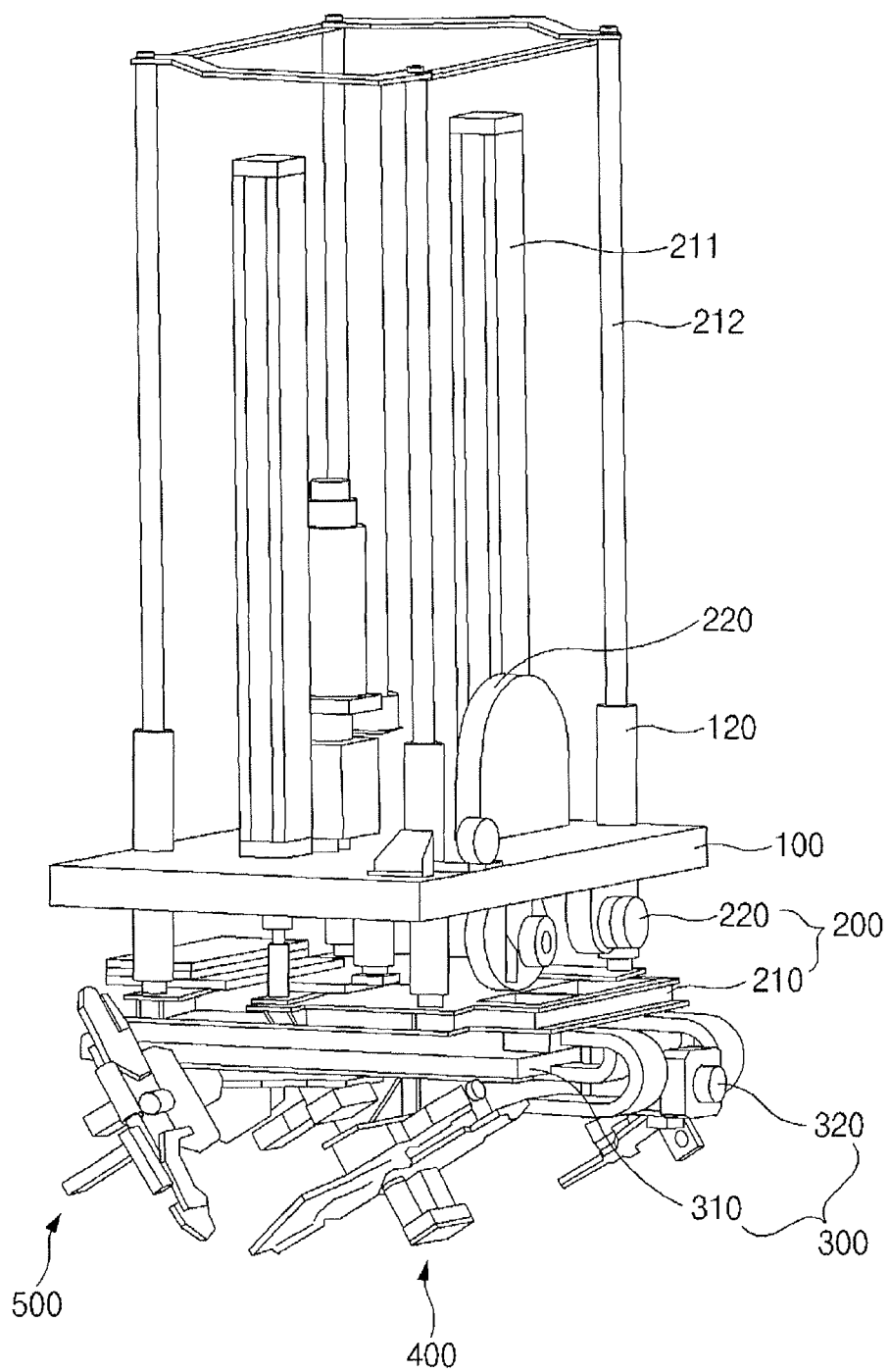
FIG. 4 is a front perspective view illustrating the exemplary multi-parts autotransferring apparatus for a vehicle according to the present invention.

As illustrated in FIGS. 2 to 4, the multi-parts autotransferring apparatus according to various embodiments of the present invention is to transfer parts to an assembly line (not illustrated) to be mounted in a car body and includes a body 100 configured to be mounted to be spaced apart from a ground by a plurality of supports 110 and have the part 1 disposed at a lower portion thereof, a vertical moving part 200 configured to be mounted at the lower portion of the body 100 to descend toward the part 1, a horizontal moving part 300 configured to be mounted at a lower portion of the vertical moving part 200 to be advanced and retreated in a front and rear direction (longitudinal direction of a car body) of the part 1, front jig parts 400 configured to be each mounted at both sides of a front of the horizontal moving part 200 and hold both side portions of a front of the part 1, and rear jig parts 500 configured to be each mounted at both sides of a rear of the horizontal moving part 200 and hold both side portions of a rear of the part 1.

Referring to FIGS. 2 and 3, the body 100 has a rectangular plate and has at least four supports 110 disposed at each corner thereof and is fixed while being spaced apart from a ground, such that the part 1 moving to the assembly line is disposed at the lower portion of the body 100.

Further, each corner of an upper surface of the body 100 is provided with guide pieces 120 having a hollow which penetrates through each corner, in which the guide pieces 120 have guide bars 212 slidably inserted thereinto.

The vertical moving part 200 includes a vertical moving member 210 configured to be slidably mounted at the lower portion of the body 100 in a direction of the part 1 and a first motor 220 configured to move the vertical moving member 210 in the direction of the part 1.

The vertical moving member 210 includes a vertical moving piece 211 configured to be mounted at the lower portion of the body 100 and guide bars 212 configured to be disposed at each corner of the vertical moving pieces 211 and slidably inserted into the hollows of the guide pieces 120 which are disposed at each corner of the body 100.

The first motor 220 includes a first gear (not illustrated) disposed at a rotating shaft thereof, in which the first gear is meshed with a rack gear (not illustrated) which is vertically disposed at the vertical moving member 210.

That is, the first gear rotates at the time of a rotation of the first motor 220, the rack gear descends or ascends by the first gear, and the vertical moving member 210 moves vertically by the rack gear.

Therefore, in the vertical moving part 200, when the first motor 220 rotates, the vertical moving piece 211 of the vertical moving member 210 descends by the first motor 220. In this case, the vertical moving member 210 is disposed at the lower portion of the body 100 to be close to the moving part 1 while vertically descending by the guide piece 120 of the guide bar 212.

The horizontal moving part 300 includes a horizontal moving member 310 configured to be disposed at the lower portion of the vertical moving part 200 and disposed to be advanced or retreated in a front and rear direction (longitudinal direction of a car body) of the part 1 and a second motor 320 configured to advance or retreat the horizontal moving member 310 in a front and rear direction of the part 1.

In this configuration, the horizontal moving part 300 is provided with a screw shaft 330 configured to be disposed at the lower portion of the vertical moving part 200 in the front and rear direction of the part 1 and rotate by the second motor 320 and the horizontal moving member 310 is advanced or retreated along the screw shaft 330 at the time of a rotation of the screw shaft 330 while the horizontal moving member 310 being coupled with the screw shaft 330.

Therefore, in the horizontal moving part 300, when the second motor 320 rotates, the screw shaft 330 rotates by the second motor 320 and the horizontal moving member 310 is disposed on the upper portion of the part 1 while being advanced or retreated along the screw shaft 330, by the rotation of the screw shaft 330.

Figure 5:
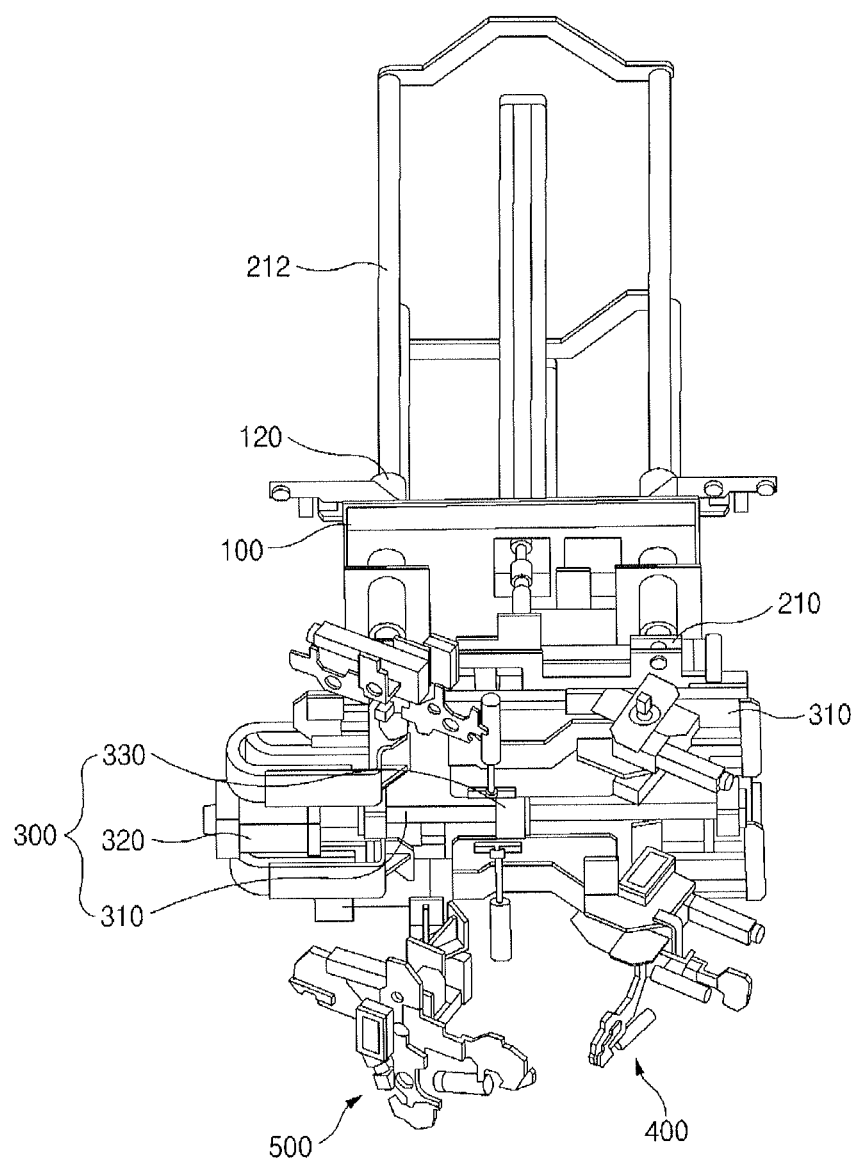
FIG. 5 is a bottom perspective view illustrating the exemplary multi-parts autotransferring apparatus for a vehicle according to the present invention.
Figure 6:
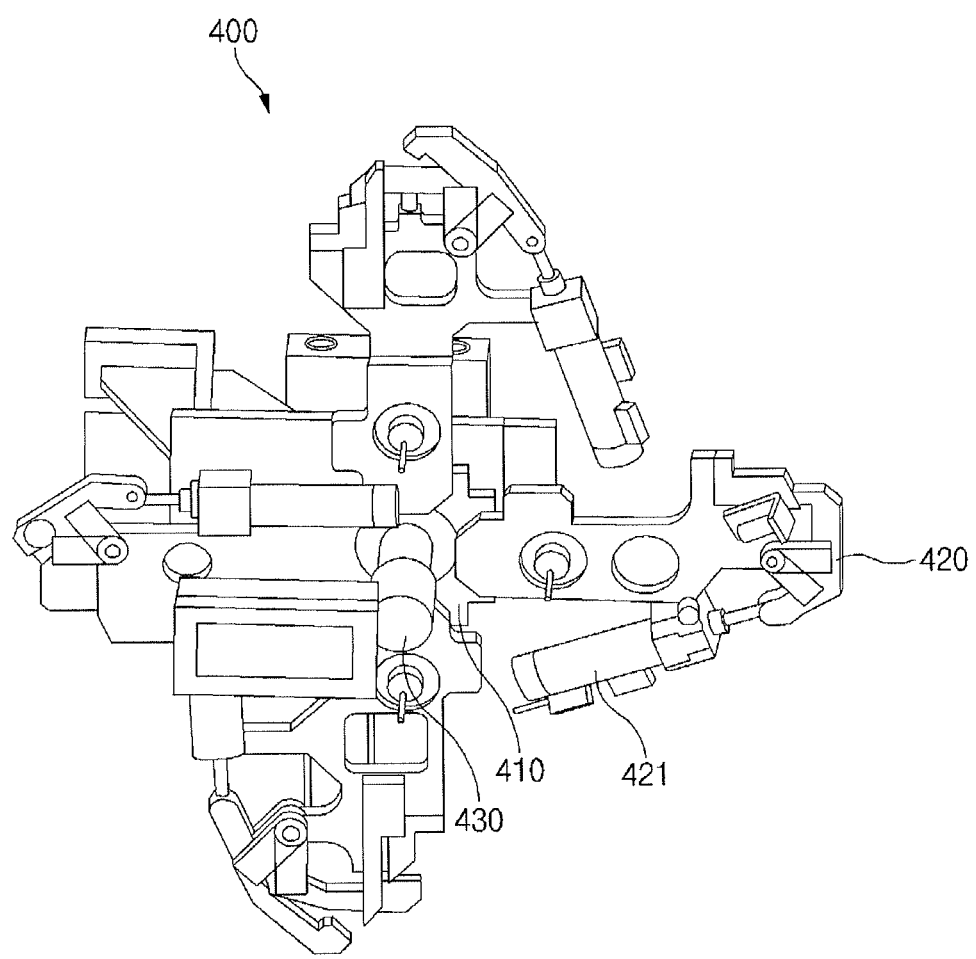
FIG. 6 is a perspective view illustrating a front jig part of the exemplary multi-parts autotransferring apparatus for a vehicle according to the present invention.

As illustrated in FIGS. 5 and 6, the front jig part 400 includes front rotating members 410 configured to be rotatably disposed at both sides of a front of the horizontal moving part 300, a plurality of front jigs 420 having different lengths configured to be disposed at a side portion of the front rotating member 410 in a rotating direction, and a third motor 430 configured to direct any one of the plurality of front jigs 420 disposed at the front rotating member 410 to the part 1 by rotating the front rotating member 410.

In this case, the front jig 420 holds the side portion of the front of the part 1 while vertically rotating by a hydraulic cylinder 421.

Meanwhile, the front jig part 400 may be rotatably disposed at both side portions of the front of the horizontal moving part 300 in an inclined state depending on the moving angle of the part 1.

Meanwhile, a leading end of the plurality of front jigs 420 may be provided with a front pressing piece having a clamp shape, in which the front pressing piece is folded or expanded by the hydraulic cylinder (not illustrated). That is, the plurality of front jigs 420 press and hold the side portion of the front of the part 1 using the front pressing piece having the clamp shape.

Therefore, in the front jig part 400, when the part 1 moves to the lower portion of the body 100, the front rotating member 410 rotates by driving the third motor 430, such that the front jig 420 for a part meeting a car model among the plurality of front jigs 420 having various sizes and lengths which are disposed at the side portion of the front rotating member 410 is disposed to be toward the part 1. As the hydraulic cylinder 421 is actuated in this state to rotate the front jig 420, both side portions of the front of the part 1 are each held.

Figure 7:
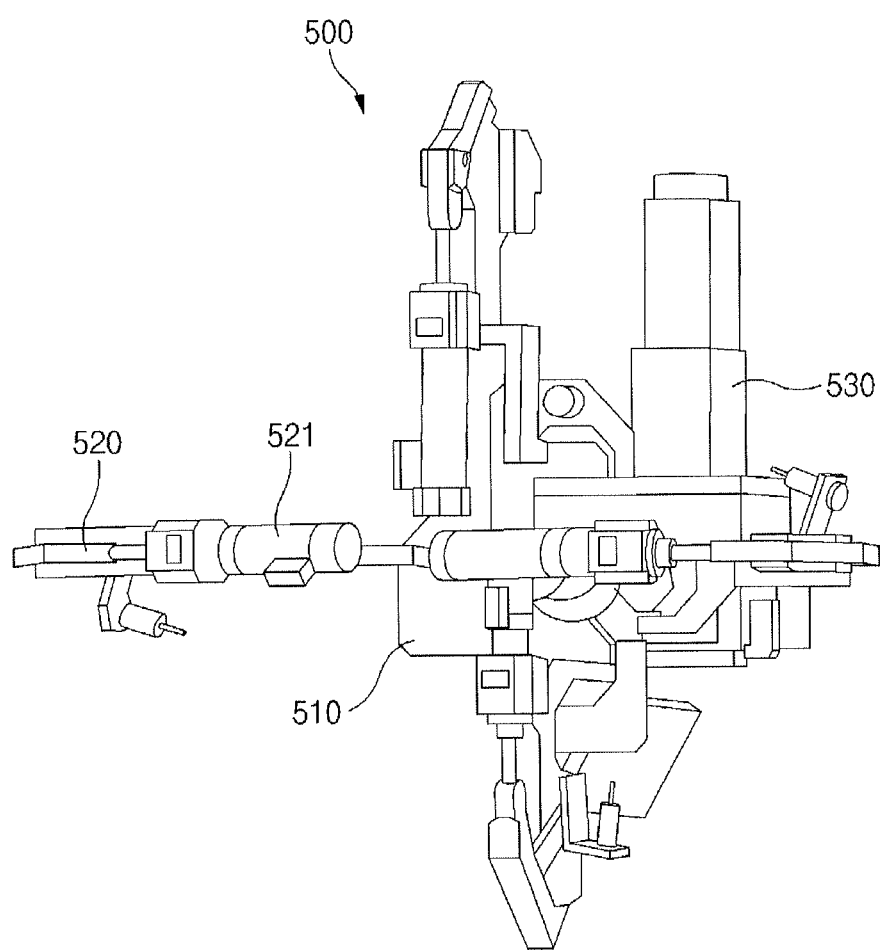
FIG. 7 is a perspective view illustrating a rear jig part of the exemplary multi-parts autotransferring apparatus for a vehicle according to the present invention.

As illustrated in FIGS. 5 and 7, the rear jig part 500 includes rear rotating members 510 configured to be rotatably disposed at both sides of a rear of the horizontal moving part 300, a plurality of rear jigs 520 having different lengths configured to be disposed at a side portion of the rear rotating member 510, and a fourth motor 530 configured to direct any one of the plurality of rear jigs 520 disposed at the rear rotating member 510 to the part 1 by rotating the rear rotating member 510.

In this case, the rear jig 520 holds the side portion of the rear of the part 1 while vertically rotating by a hydraulic cylinder 521.

Further, the rear jig 520 may be rotatably disposed at both side portions of the rear of the horizontal moving part 300 in a vertical state so as to move the part 1 to a car body depending on the mounting shape of the part 1.

Meanwhile, the rear jig parts 500 each disposed at both side portions of the rear of the horizontal moving part 300 is slidably disposed in a direction corresponding to each other by a width moving part 600, thereby stably supporting the rear of the part 1 having a different size depending on a car model.

Meanwhile, a leading end of the plurality of rear jigs 520 may be provided with a rear pressing piece having a clamp shape, in which the rear pressing piece is folded or expanded by the hydraulic cylinder (not illustrated). That is, the plurality of rear jigs 520 press and hold the rear side portion of the part 1 using the rear pressing piece having the clamp shape.

Therefore, in the rear jig part 500, when the part 1 moves to the lower portion of the body 100, the rear rotating member 510 rotates by driving the fourth motor 430, such that the rear jig 520 for a part meeting a car model among the plurality of rear jigs 520 having various sizes and lengths which are disposed at the side portion of the rear rotating member 510 is disposed to be toward the part 1. As the hydraulic cylinder 521 is actuated in this state to rotate the rear jig 520, both side portions of the rear of the part 1 are each held.

Figure 8:
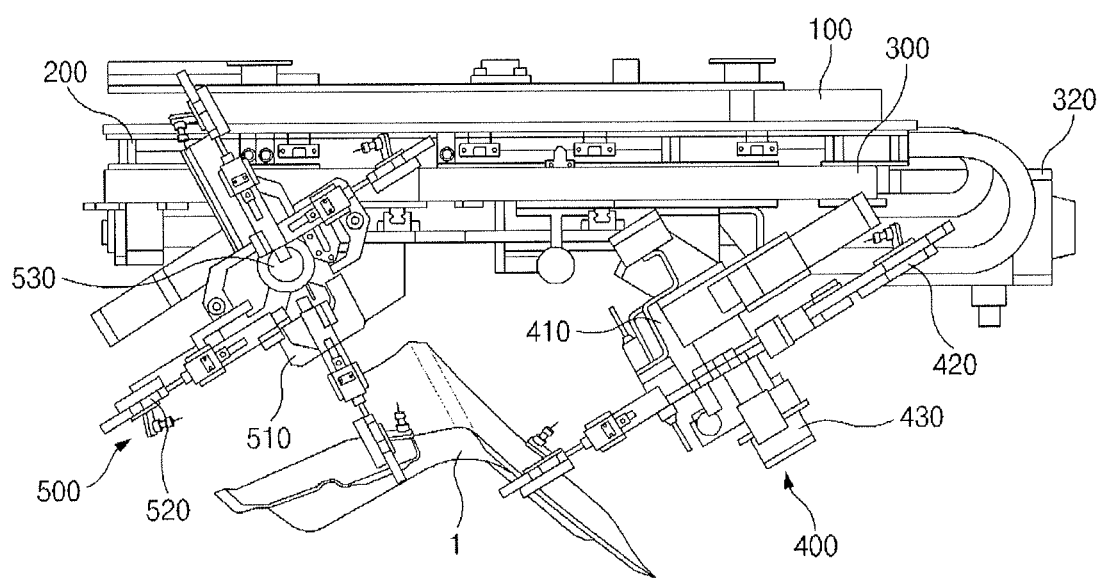
FIG. 8 is a diagram illustrating a width moving part of the exemplary multi-parts autotransferring apparatus for a vehicle according to the present invention.

As illustrated in FIG. 8, the width moving part 600 includes rack gears 610 configured to be each disposed at the rear jig parts 500 which are each disposed at both side portions of the rear of the horizontal moving part 300 to correspond to each other, a pinion 620 configured to be meshed between the rack gears 610 which are each disposed at the rear jig part 500, and a fifth motor 630 configured to rotate the pinion 620.

That is, in the width moving part 600, when the pinion 620 rotates by the fifth motor 630, the rack gear 610 disposed at the rear jig parts 500 moves and the rear jig parts 500 move in a direction corresponding to each other, along with the rack gear 610.

Figure 9:
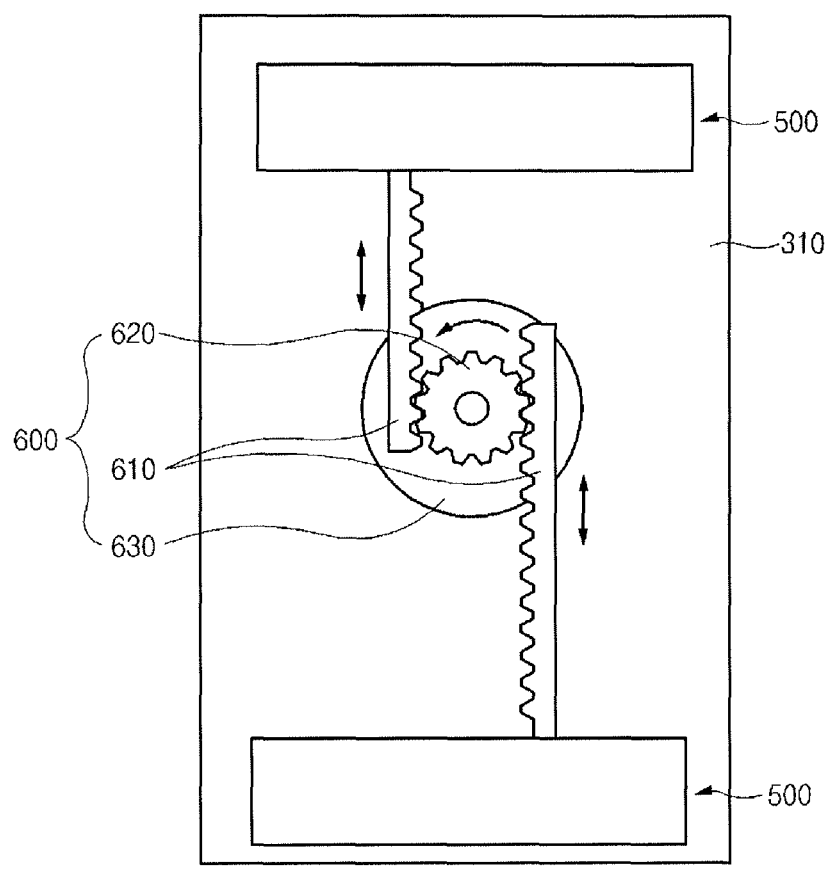
FIG. 9 is a diagram schematically illustrating a state in which the exemplary multi-parts autotransferring apparatus for a vehicle according to the present invention holds a trunk.

According to the multi-parts autotransferring apparatus for a vehicle according to various embodiments of the present invention having the above configuration, as illustrated in FIG. 9, when the part 1 moves to the lower portion of the body 100, the front and rear jig parts 400 and 500 move to be disposed at the front and rear of the part 1 by the horizontal moving part 300 and a position of the rear jig part 500 moves to meet a rear width of the part 1 by the width moving part 600 and then the rear jig part 500 is disposed at the part 1 by descending the front and rear jig parts 400 and 500 by the vertical moving part 200.

Next, the front and rear jigs 420 and 520 rotate by the hydraulic cylinders 421 and 521 to hold the front and rear side portions of the part 1.

Therefore, the multi-parts autotransferring apparatus for a vehicle according to various embodiments of the present invention controls the front and rear jig parts 400 and 500 depending on the length, height, and width of the part to compatibly hold the part 1 having various sizes, thereby increasing the continuity and efficiency of work.

According to various embodiments of the present invention, the parts of various car models may move to the assembly line without exchanging the separate units, thereby increasing the continuity and efficiency of work.

For convenience in explanation and accurate definition in the appended claims, the terms upper or lower, front or rear, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A multi-parts autotransferring apparatus for transferring parts to be mounted in a car body, comprising:
    a body configured to be mounted to be spaced apart from a ground by a plurality of supports and have a transfer part disposed at a lower portion thereof;
    a vertical moving part configured to be mounted at the lower portion of the body to descend toward the transfer part;
    a horizontal moving part configured to be mounted at a lower portion of the vertical moving part to be advanced and retreated in a front and rear direction of the transfer part;
    front jig parts configured to be each mounted at opposing sides of a front of the horizontal moving part and hold opposing side portions of a front of the transfer part; and
    rear jig parts configured to be each mounted at opposing sides of a rear of the horizontal moving part and hold opposing side portions of a rear of the transfer part,
    wherein the horizontal moving part includes a horizontal moving member configured to be disposed at the lower portion of the vertical moving part and disposed to be advanced or retreated in a front and rear direction of the transfer part and a second motor configured to advance or retreat the horizontal moving member in a front and rear direction of the transfer part.

2. The multi-parts autotransferring apparatus according to claim 1, wherein the vertical moving part includes a vertical moving member configured to be slidably mounted at the lower portion of the body in a direction of the transfer part and a first motor configured to move the vertical moving member in the direction of the transfer part.

3. The multi-parts autotransferring apparatus according to claim 2, wherein the vertical moving member includes a vertical moving piece configured to be mounted at the lower portion of the body and guide bars configured to be disposed at each corner of the vertical moving pieces and slidably inserted into the guide pieces which are disposed at each corner of the body.

4. The multi-parts autotransferring apparatus according to claim 1, wherein the horizontal moving part is provided with a screw shaft configured to be disposed at the lower portion of the vertical moving part in the front and rear direction of the transfer part and rotate by the second motor and the horizontal moving member is advanced or retreated along the screw shaft at the time of a rotation of the screw shaft while the horizontal moving member being coupled with the screw shaft.

5. The multi-parts autotransferring apparatus according to claim 1, wherein the front jig part includes front rotating members configured to be rotatably disposed at opposing sides of a front of the horizontal moving part, a plurality of front jigs having different lengths configured to be disposed at a side portion of the front rotating member, and a third motor configured to direct any one of the plurality of front jigs disposed at the front rotating member to the transfer part by rotating the front rotating member.

6. The multi-parts autotransferring apparatus according to claim 5, wherein the front jig holds the side portion of the front of the transfer part while vertically rotating by a hydraulic cylinder.

7. The multi-parts autotransferring apparatus according to claim 5, wherein the front jig part is rotatably disposed at opposing side portions of the front of the horizontal moving part in an inclined state.

8. The multi-parts autotransferring apparatus according to claim 1, wherein the rear jig part includes rear rotating members configured to be rotatably disposed at opposing sides of a rear of the horizontal moving part, a plurality of rear jigs having different lengths configured to be disposed at a side portion of the rear rotating member, and a fourth motor configured to direct any one of the plurality of rear jigs disposed at the rotating member to the transfer part by rotating the rear rotating member.

9. The multi-parts autotransferring apparatus according to claim 8, wherein the rear jig holds the side portion of the rear of the transfer part while vertically rotating by a hydraulic cylinder.

10. The multi-parts autotransferring apparatus according to claim 8, wherein the rear jig is rotatably disposed at opposing side portions of the rear of the horizontal moving part in a vertical state.

11. The multi-parts autotransferring apparatus according to claim 1, wherein the rear jig parts each disposed at the opposing side portions of the rear of the horizontal moving part are slidably disposed in a direction corresponding to each other by a width moving part.

12. The multi-parts autotransferring apparatus according to claim 11, wherein the width moving part includes rack gears configured to be each disposed at the rear jig parts which are each disposed at opposing side portions of the rear of the horizontal moving part to correspond to each other, a pinion configured to be meshed between the rack gears which are each disposed at the rear jig part, and a fifth motor configured to rotate the pinion.

13. A multi-parts autotransferring apparatus for transferring parts to be mounted in a car body, comprising:
    a body configured to be mounted to be spaced apart from a ground by a plurality of supports and have a transfer part disposed at a lower portion thereof;
    a vertical moving part configured to be mounted at the lower portion of the body to descend toward the transfer part;
    a horizontal moving part configured to be mounted at a lower portion of the vertical moving part to be advanced and retreated in a front and rear direction of the transfer part;

front jig parts configured to be each mounted at opposing sides of a front of the horizontal moving part and hold opposing side portions of a front of the transfer part; and rear jig parts configured to be each mounted at opposing sides of a rear of the horizontal moving part and hold opposing side portions of a rear of the transfer part, wherein the front jig part includes front rotating members configured to be rotatably disposed at opposing sides of a front of the horizontal moving part, a plurality of front jigs having different lengths configured to be disposed at a side portion of the front rotating member, and a third motor configured to direct any one of the plurality of front jigs disposed at the front rotating member to the transfer part by rotating the front rotating member.

14. A multi-parts autotransferring apparatus for transferring parts to be mounted in a car body, comprising:

a body configured to be mounted to be spaced apart from a ground by a plurality of supports and have a transfer part disposed at a lower portion thereof;

a vertical moving part configured to be mounted at the lower portion of the body to descend toward the transfer part;

a horizontal moving part configured to be mounted at a lower portion of the vertical moving part to be advanced and retreated in a front and rear direction of the transfer part;

front jig parts configured to be each mounted at opposing sides of a front of the horizontal moving part and hold opposing side portions of a front of the transfer part; and rear jig parts configured to be each mounted at opposing sides of a rear of the horizontal moving part and hold opposing side portions of a rear of the transfer part, wherein the rear jig part includes rear rotating members configured to be rotatably disposed at opposing sides of a rear of the horizontal moving part, a plurality of rear jigs having different lengths configured to be disposed at a side portion of the rear rotating member, and a fourth motor configured to direct any one of the plurality of rear jigs disposed at the rotating member to the transfer part by rotating the rear rotating member.

15. A multi-parts autotransferring apparatus for transferring parts to be mounted in a car body, comprising:

a body configured to be mounted to be spaced apart from a ground by a plurality of supports and have a transfer part disposed at a lower portion thereof;

a vertical moving part configured to be mounted at the lower portion of the body to descend toward the transfer part;

a horizontal moving part configured to be mounted at a lower portion of the vertical moving part to be advanced and retreated in a front and rear direction of the transfer part;

front jig parts configured to be each mounted at opposing sides of a front of the horizontal moving part and hold opposing side portions of a front of the transfer part; and rear jig parts configured to be each mounted at opposing sides of a rear of the horizontal moving part and hold opposing side portions of a rear of the transfer part, wherein the rear jig parts each disposed at the opposing side portions of the rear of the horizontal moving part are slidably disposed in a direction corresponding to each other by a width moving part, and wherein the width moving part includes rack gears configured to be each disposed at the rear jig parts which are each disposed at opposing side portions of the rear of the horizontal moving part to correspond to each other, a pinion configured to be meshed between the rack gears which are each disposed at the rear jig part, and a fifth motor configured to rotate the pinion.

* * * * *